June 19, 1928.

L. F. BUFF 1,674,317

SHAFT BEARING

Filed March 24, 1925

Inventor:
Louis F. Buff,
by Emery, Booth, Janney & Varney
Attys

Patented June 19, 1928.

1,674,317

UNITED STATES PATENT OFFICE.

LOUIS F. BUFF, OF JAMAICA PLAIN, MASSACHUSETTS.

SHAFT BEARING.

Application filed March 24, 1925. Serial No. 17,917.

This invention relates to bearings for shafts and aims to provide an improved bearing particularly adapted for instruments of precision such as transits, telescopes and theodolites, etc.

Figure 1:
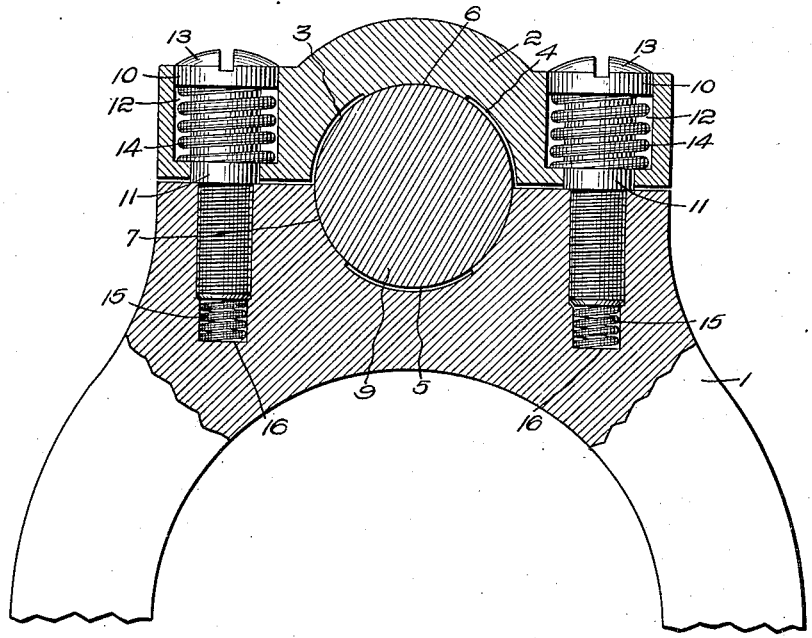
Figure 2:
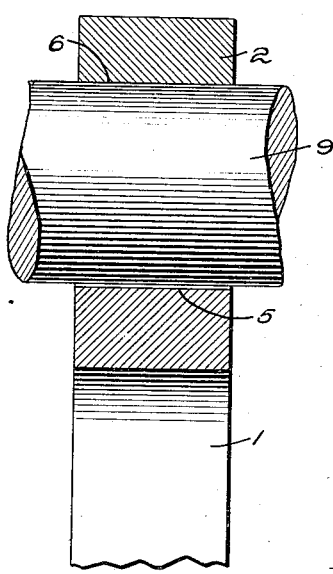

In the drawing of the particular embodiment of my invention illustrated and described herein, Fig 1 is a side elevation partly in section for clearness; and Fig. 2 is a vertical cross-section on the line 2—2, Fig. 1.

Referring to Fig. 1, my novel bearing comprises a lower member 1, of suitable size, commonly the top of the standard, and a top or cap member 2 therefor.

In instruments of this nature, obviously perfection of workmanship and accuracy in use and results are the all important objects to be sought. Accuracy to even 1/50th of 1/1000th of an inch is demanded and every feature of construction conducive to accurate results is very necessary.

It is also not only desirable, but necessary, in using instruments of this type to have the telescope bearing so close a fit that the instrument, not shown, will remain in position after adjustment and permit transportation and moving of the same, and also provide security against movement by the wind or reasonably slight vibration from any cause. To obtain this close fit required for stability of the telescope, it will be clear that the fit between the bearing and shaft ends must be very accurate, as little or no lubrication can be used. Consequently and necessarily the degree of wear in such cases is large as compared with cases where free lubrication is provided for.

To reduce the amount of wear to as low a point as possible, I have conceived the plan of cutting away parts of the bearings in both the upper and lower members, leaving very shallow arcuate spaces 3, 4, 5 between the bearing 1 and shaft 9, and permitting the shaft to ride on spaced sections or arcuate bearings 6, 7, 8. Naturally the lower side of the shaft 9 at its end and opposite recess 5 will ordinarily receive the most wear due to the weight of the telescope, and this is avoided and the wear distributed more evenly between the arcuate bearings 7, 8 by providing the recess 5. Really no bearing member is necessary at 6 except to protect the shaft end from all danger of dislodgement from the member 1 during handling and transportation, and to ensure close working fit between the shaft and arcuate bearings 7, 8.

It is desirable, however, to have at all times a constant slight pressure on the shaft 9 by the member 2 for the purpose of producing a tight fit between the shaft and its bearings, and thus ensure accuracy of movement of the telescope, and uniformity of wear in the bearings so far as practicable, and to permit moving and transportation of the instrument.

These objects I attain by providing the member 2 with screws 10 threaded into the upper face of the member 1, and provided with a shoulder 11, which is set up firmly against the member 1.

The member 2 is preferably provided with recesses 12 to receive the screw heads 13 and also a spring 14, one end of which seats against the screw head 13, while the opposite end seats against the shoulder 11 in the recess 12. This construction provides for a uniform and continued pressure by the member 2 on the shaft 9, taking up automatically and promptly all looseness between the parts. This uniform pressure provides the friction necessary to maintain the shaft and its telescope in position against reasonable force, permits safe transportation and avoids necessity for frequent readjustment.

The shoulders provide a positive and firm seat for the screws and a positioning of the member 2 with the maximum clearance of 1/64th of an inch for future adjustment, and help in securing continued equal pressure throughout the bearing arcs and thus prevent inaccuracy of adjustment from unequal wear of parts which follows the present use of set screws individually set up to hold member 2 on member 1, and which are seldom if ever turned up to the same extent. By taking up the wear as it occurs, moreover, dust is prevented from getting access to the clearance between the parts.

The nature of the use of a transit is such that for most of the adjustments of the telescope, it is only moved a short distance from the horizontal. This use results in more uneven wear of the bearings than would be the case if the telescope were frequently turned through a complete circle. Hence, when the telescope is turned through a complete circle and reversed, as in triangulation work, the uneven bearing or looseness, if not prevented by automatic action of the spring 14, becomes more apparent and results in inaccuracy which it is most desirable to avoid. This is avoided largely by my construction because the looseness is constantly being taken up.

Of course the accuracy of the adjustment of the member 2 relative to the member 1 depends largely upon the uniformity of the temper of the spring 14. Usually this can be obtained. Sometimes, however, it is impossible to secure exact uniformity. In such case, the screw carrying the strongest spring must be backed off or unscrewed a little so that the two ends of the member 2 will be equi-distant from the member 1.

Or, sometimes, after long use, one spring loses part of its strength and allows its end of the member 2 to rise from the member 1 further than it should. Then either the screw carrying the stronger spring must be backed off or a new spring substituted for the weak one, and if the instrument is being used in the field, this is usually impossible.

Therefore, in either of the above cases, when one of the screws is backed off so that its shoulder does not seat against the member 1, then results the possibility of the screw working loose with the consequent uneven positioning of the two ends of the member 2. To guard against this danger, I have conceived the idea of using a compensating spring 15 in a counterbored socket 16 of the hole for the screw 14, one end of the spring being seated against the screw end while the opposite end is seated on the bottom of the socket This feature ensures stability of position for the screw 14 under circumstances such as are described.

My invention is not restricted to the precise embodiment thereof illustrated and described herein, and I claim:

A shaft bearing for instruments of precision and the like comprising a lower member, bored and counterbored to receive a screw and a screw locking spring thereunder; an upper member bored and counterbored to receive a screw and a spring thereabout; a shouldered screw seated at its shoulder on the lower member with a spring seated in the counterbore and yieldingly engaging the lower end of the screw, and a spring seated in the counterbore of the upper member and yieldingly engaging the screw head whereby the screw is positively seated in the lower member, and the upper member is yieldingly held upon the shaft.

In testimony whereof, I have signed my name to this specification.

LOUIS F. BUFF.